Feb. 21, 1933.  W. A. GEDRIS  1,898,176
BALL BEARING SEAT HANGER
Filed Sept. 17, 1930
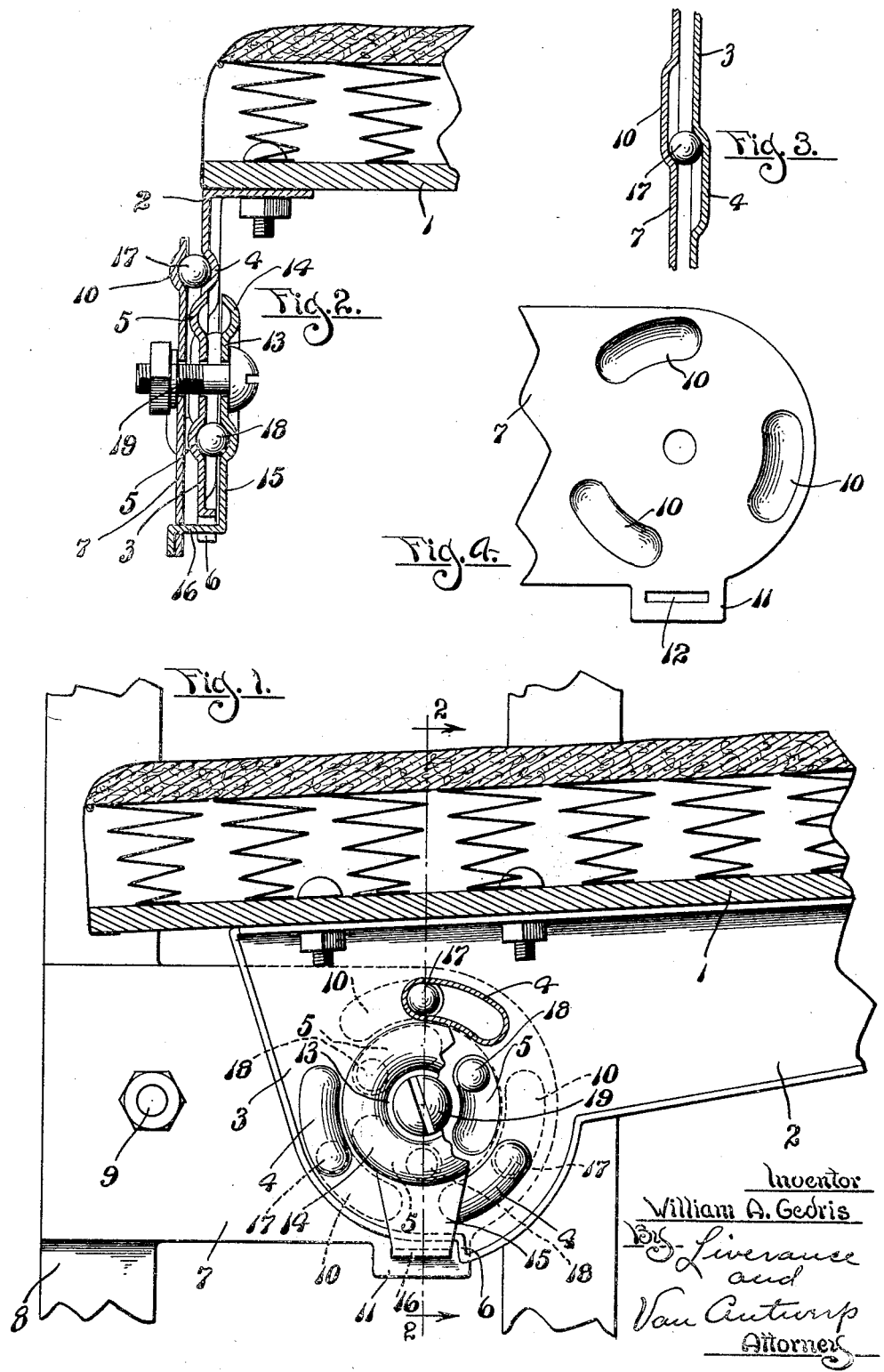

Patented Feb. 21, 1933

1,898,176

UNITED STATES PATENT OFFICE

WILLIAM A. GEDRIS, OF GRAND RAPIDS, MICHIGAN

BALL BEARING SEAT HANGER

Application filed September 17, 1930. Serial No. 482,473.

This invention relates to a ball bearing seat hanger which is particularly useful in connection with seats used in opera houses though it may also be used for mounting and hanging school seats, and in general is adapted for use with any seat which is to be swung about a horizontal axis adjacent its rear end between vertical and horizontal positions.

It is a primary object and purpose of the present invention to provide a very practical and economically constructed hanger for seats of this character which makes use of anti-friction balls to eliminate friction and bind so that the pivotal movements of the seat are very easily accomplished. A further object of the invention is to provide a construction wherein the balls and the races therefor may cooperate to cushion the downward movement of the seat and normally hold the seat, before any weight is brought thereagainst, slightly above its lowermost position which position is controlled and governed by a novel stop structure to positively hold the seat against any further downward movement. The invention consists of novel constructions and arrangements and organizations of parts for accomplishing these ends, as well as many others, in a practical and efficient manner, as will appear upon an understanding of the invention had from the following description taken in connection with the accompanying drawing, in which, Fig. 1 is a fragmentary side elevation, partly in section, and with certain parts broken away for better disclosure of the structure, showing the seat in a lower position or slightly above its lowermost position.

Fig. 2 is a fragmentary transverse vertical section on the plane of line 2—2 of Fig. 1.

Fig. 3 is a fragmentary somewhat enlarged horizontal section illustrating the cushioning action of the balls when the seat is lowered nearly to its lowermost position, and Fig. 4 is a fragmentary side elevation of the free end of the main supporting bracket for the seat.

Like reference characters refer to like parts in the different figures of the drawing.

The seat, which may be of any desired character, shown as a spring seat in the drawing, has a base 1 to the underside of which near each side edge a bracket 2 made from flat metal is permanently secured. Each of the brackets at its rear end is widened downwardly and enlarged, as indicated at 3, and has a transverse opening therein around which a plurality of outer ball grooves or races 4 are pressed inwardly having a common radius around the central opening noted. There are three of these ball races 4 spaced equal distances apart. Other ball races 5 are pressed in the opposite direction outwardly from the enlarged end 3 of the bracket 2 and are also of arc shape, having a common radius around the central opening described but on a shorter radius than that of the races 4. The races 5 are likewise spaced equal distances apart and are of substantially the same length as the ball races 4 first described. At the lower side of each of the ends 3 of the brackets 2 there is formed a stop shoulder 6, as best shown in Fig. 1, and which is a shoulder between two arc shaped sections of different radii on the end 3 of said bracket 2.

The main supporting bracket 7 is permanently secured adjacent one end to a vertical post or other support 8 by means of a bolt 9. The specific detail of the connection by which the bracket is supported and held against any downward pivotal movement about the bolt 9 forms no part of this invention but is conventional and well-known. The bracket 7 extends horizontally forward and its free end is shaped substantially in the arc of a semi-circle at the center of which is an opening which in the assembly of the parts is designed to be located in alinement with the opening through the rear end 3 of the bracket 2. Grooved ball races 10, three in number, and equally spaced in a circle having its center at the center of the opening through the bracket 7, are pressed outwardly from the free end portion of the bracket 7 so as to lie opposite the grooved ball races 4 previously described. At the lower side of the free end portion of the bracket 7 directly below said opening described therein the bracket is provided with a downwardly extending lug 11 through which a somewhat elongated horizontal slot 12 is cut (see Fig. 4).

A circular member 13 of flat metal is provided which likewise has a central opening therein and which is formed near its edges with a continuous ball race 14 pressed inwardly and adapted to lie opposite the ball races 5 in the end portion 3 of the associated bracket 2. At the lower side of the member 13 it is provided with a downwardly extending integral tongue 15 which at its lower portion is bent at right angles to extend back of the stop shoulder 6 and then pass through the slot 12 after which the end may be bent downwardly as shown in Fig. 1 to make an interlocking connection.

In the assembly of the parts the seat with the brackets 2 attached are disposed with the end portions 3 of said brackets located inside of the free end portions of the main supporting brackets 7 and anti-friction balls 17 are located at the inner sides of the ends 3 of the brackets 2 and balls 18 disposed in the races 5 and 14. A bolt 19 is passed through the alined openings in the bracket 7, the end 3 of the bracket 2, and the member 13 and equipped with a nut whereby the parts may be drawn snugly together and the part 16 of tongue 15 carried through the slot 12 after which it is bent downwardly; or the down turned tongue on the part 16 may be first bent downwardly at right angles from said part 16 and hooked through the slot 12, the part 13 being then brought upwardly into proper position.

A seat mounted by use of the construction described may be turned through an angle of 90° substantially. When the seat is moved toward its lower position the balls 17 in the races 4 and 10 come to the ends of the races as shown in Fig. 3 and normally stop the seat from downward movement a short time before the shoulder 6 would engage against an edge of the horizontal portion 16 of the tongue 15. This is shown in Fig. 1. There is a tendency for the balls to wedge or press the two parts 7 and 3 apart and therefore cushion the seat when it falls freely downward, due to the fact that the material of the brackets 7 and 2 has a certain yielding or spring tendency permitting some separation by the balls; but not yielding sufficiently under the mere falling weight of the seat that the stop 6 comes abruptly against said part 16. But when weight is applied to the seat at the upper side the parts 3 and 7 yield enough to bring the positive stop shoulder 6 against part 16 and prevent further downward movement.

The construction described is one which has proved very practical and satisfactory in use. The various metal parts of the construction are of flat metal readily formed to the desired shapes by means of dies and very economically produced. The assembly is quick and easy. The construction is durable in service and fully capable of withstanding the somewhat severe usage to which it may be subjected. The invention is defined in the appended claims and is to be considered comprehensive of all forms of structure coming within their scope.

I claim:

1. In a construction of the class described, a supporting bracket having an opening therethrough and a plurality of spaced apart outwardly extending arc shaped ball races in said bracket concentric with said opening, a seat, a bracket attached to the lower side of said seat and extending downwardly therefrom and inside the first bracket, at one end having an opening therethrough and a plurality of inwardly extending arc shaped ball races therein opposite the ball races in said supporting bracket, and having a second series of outwardly extending spaced apart arc shaped ball races nearer said opening in said bracket, both series of ball races in the second bracket being concentric with the opening therethrough, a member of metal located at the inner side of said second bracket and having an opening therethrough and a continuous ball race of circular form around said opening opposite the second series of ball races in the second bracket, a bolt passing through the openings in said brackets and member, and balls located in the races between said brackets and between the second bracket and said member whereby the seat may be turned through substantially 90° from a vertical to a horizontal position or vice versa, said balls in the cooperating series of ball races on the brackets coming to the ends of the ball races when the seat is in substantially horizontal position.

2. A construction containing the elements in combination defined in claim 1, combined with a tongue extending downwardly from said member and being turned outwardly and passing through the first bracket, and a stop on the bracket on said seat adapted to engage against the outwardly turned portion of said tongue when the seat has been brought to its lowermost position.

3. In a structure of the class described, a vertical support, a supporting bracket attached to and extending horizontally therefrom having an opening in its free end portion and a plurality of spaced apart arc shaped ball races pressed from the bracket concentric with said opening, a seat, a second bracket attached to and extending from the seat having one end portion thereof with an opening therethrough located alongside the first bracket and having a plurality of spaced apart ball races pressed therefrom opposite the ball races in the first bracket, and also having a plurality of spaced apart ball races pressed therefrom in the opposite direction, both series of ball races in the second bracket being concentric with the opening through said second bracket, a circular member of metal having a central opening therethrough and a continuous ball race pressed from said circular member opposite the second series of ball races in the second bracket, balls between said brackets in the ball races thereof and between said second bracket and circular member, a bolt passing through the openings in the brackets and circular member adapted to be tightened to bring the brackets and said circular member snugly against said balls, said cooperating ball races in the two brackets being of a length and so located whereby the seat may be turned to vertical position or dropped toward horizontal position and when near horizontal position the balls will come to the ends of the cooperating ball races and cushion the fall of said seat.

4. A construction containing the elements in combination defined in claim 3, combined with a tongue projecting downwardly from said circular member and turned at right angles to pass through the first bracket, and a cooperating radially extending shoulder on the second bracket adapted to be brought closely adjacent to and positioned a short distance in front of the laterally turned portion of said tongue when the balls reach the ends of said spaced apart ball races in the brackets and normally stop the seat in a lower position, said shoulder engaging against said laterally turned portion of the tongue upon application of weight to the seat.

5. In combination, a supporting bracket, a seat, a bracket on the seat having pivotal connection to the supporting bracket, means for cushioning the movement between the brackets when they approach their extreme positions, a stationary member located adjacent said seat bracket, said stationary member having a continuous groove concentric about the pivotal axis of the brackets, anti-friction balls in said groove between said stationary member and the seat bracket for maintaining same in separated relationship.

In testimony whereof I affix my signature.

WILLIAM A. GEDRIS.